UNITED STATES PATENT OFFICE.

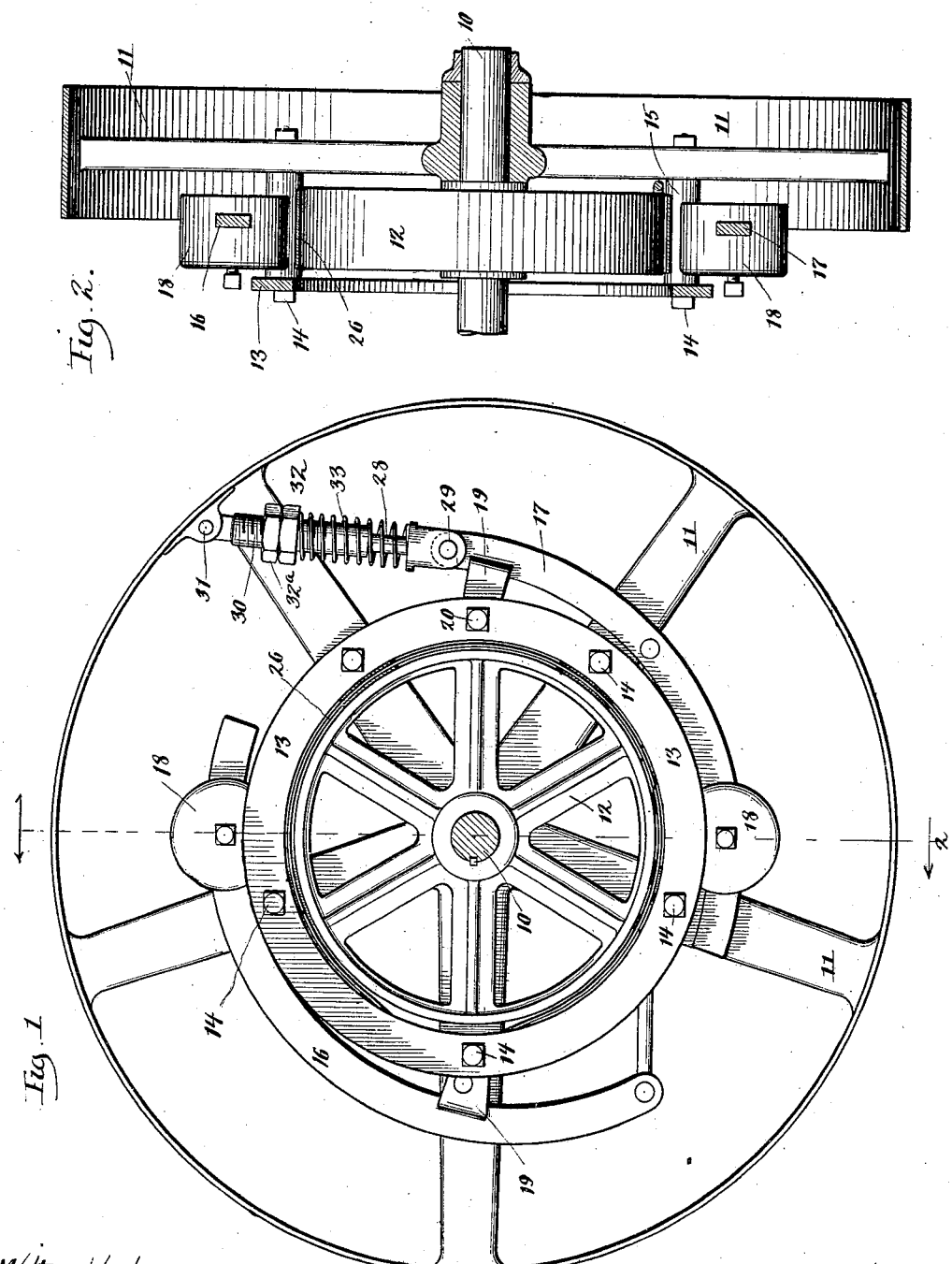

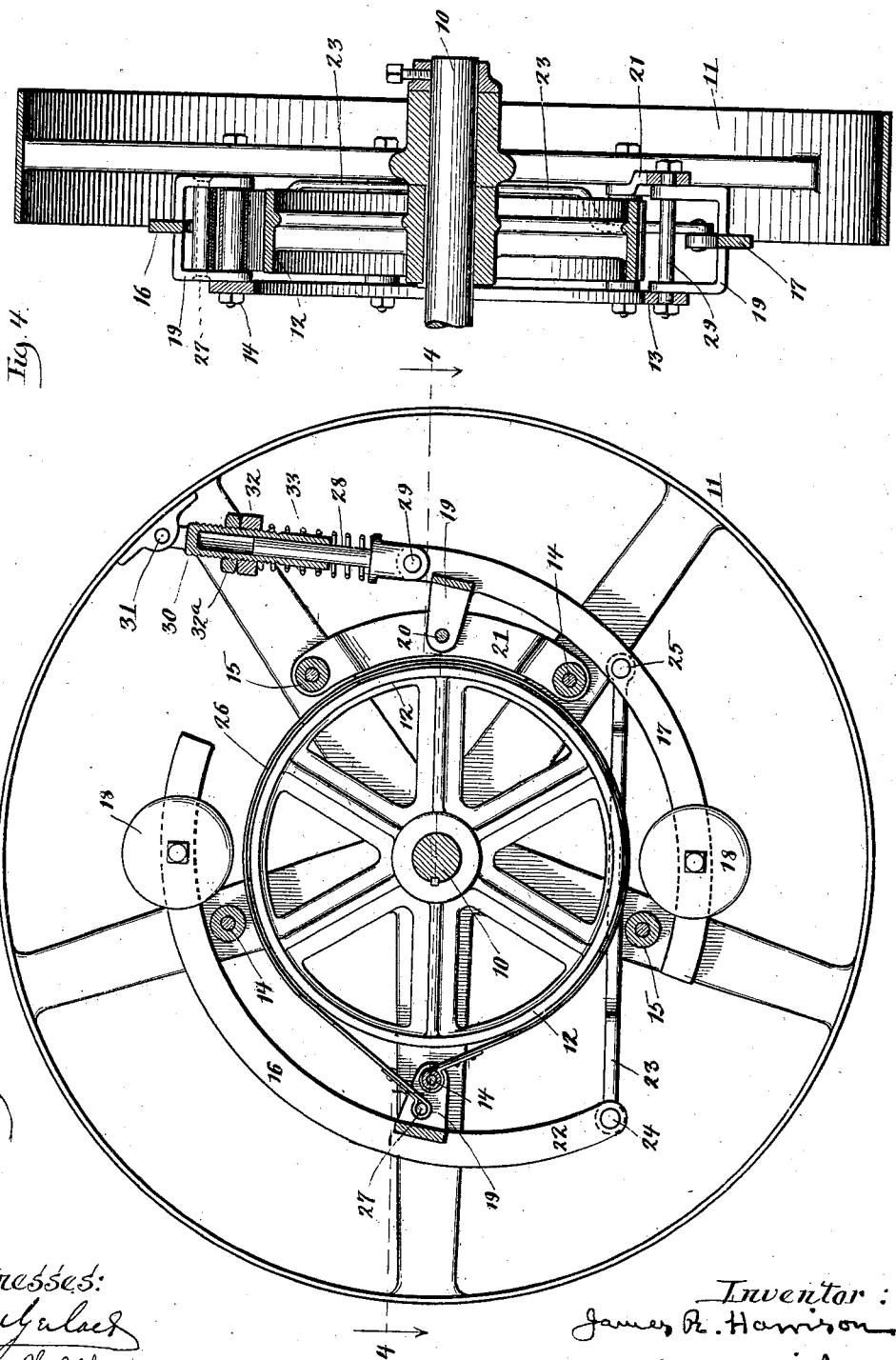

JAMES R. HARRISON, OF RACINE, WISCONSIN, ASSIGNOR TO J. I. CASE THRESHING MACHINE COMPANY, OF SAME PLACE.

AUTOMATIC CLUTCH MECHANISM.

SPECIFICATION forming part of Letters Patent No. 682,591, dated September 10, 1901.

Application filed December 24, 1900. Serial No. 40,850. (No model.)

*To all whom it may concern:*

Be it known that I, JAMES R. HARRISON, a resident of the city and county of Racine, in the State of Wisconsin, have invented certain new and useful Improvements in Automatic Clutch Mechanism, of which the following is a full, clear, and exact description.

My invention relates to that class of clutches designed to automatically operate to throw machinery into gear after the driving power has acquired a certain desired speed and to automatically throw it out of operation if for any reason the driving power slows down below the desired speed.

My invention is designed especially to be used for throwing the feed-carrier of a threshing-machine into operation when the separator has attained a threshing speed and to stop the feeding devices when the speed of the separator falls below such desired limit, although it is obvious that my improved clutch is applicable for other purposes.

The invention has for its particular object to improve the construction of such automatic clutches; and it consists in the features set forth in the following description, illustrated in the accompanying drawings, and particularly pointed out in the appended claims.

Figure 1 is a view in vertical elevation of my improved clutch mechanism. Fig. 2 is a sectional view on line 2 2 of Fig. 1. Fig. 3 is a view similar to Fig. 1, certain parts being removed and certain parts being shown in cross-section. Fig. 4 is a vertical sectional view on line 4 4 of Fig. 3.

10 is the shaft to be driven and is designed to operate the feeding devices of a threshing-machine or the like which is to be thrown into and out of operation. Upon the shaft 10 is mounted a loose pulley 11, and upon the shaft adjacent the pulley is keyed a friction-wheel 12, so that the rim of the friction-wheel extends inside of the rim of the pulley 11. A flat ring 13, somewhat larger than the wheel 12, is held in position adjacent the inner face of the wheel 12 by means of the bolts 14, secured to the spokes of the pulley 11 and the spacing-thimbles 15. Curved governor-arms 16 and 17 are located intermediate the rims of the pulley 11 and the wheel 12 and are provided at one end with adjustable weights 18 and at the other ends with U-shaped offsets 19, extending substantially at right angles thereto. The end of the U-shaped offset 19 of the governor-arm 16 pivotally engages one of the bolts 14, intermediate ring 13, and a spoke of the pulley 11, while the ends of the U-shaped offset 19 of the governor-arm 17 pivotally engages a bolt 20, extending between the ring 13 and a short strip 21, which is secured between two of the spokes of the pulley 11 by means of the bolts 14. The governor-arm 16 is provided with an extension 22, which is connected to the governor-arm 17 by means of a link 23, pivotally secured to said parts, as at 24 and 25.

A friction-band 26 encircles the friction-wheel 12 and is secured at one end to the bolt 14, which forms the pivot of the governor-arm 16, and is secured at its other end to a bolt 27, fastened to the offset 19 of the governor-arm 16, adjacent said pivot-bolt 14.

A two-part slide is interposed between the governor-arm 17 and the rim of the pulley and normally extends substantially in line with said governor-arm. This two-part slide comprises the bolt 28, which is pivoted to the end of the governor-arm 17, as at 29, and a socket 30, in which said bolt slides and which is pivoted at its end to a lug on the rim of the pulley, as at 31. An adjustable collar 32 is threaded upon the socket 30 and held against displacement by a lock-nut 32ª, and intermediate this collar and a shoulder on bolt 28 is arranged a cushion-spring 33. By adjusting the collar it is obvious that the pressure exerted by the spring may be easily regulated.

It will be observed that the pivot-pins 20, 29, and 31 are normally out of line and that the thrust of the spring 33 in the normal position is almost directly opposed to the initial movement of the pin 29, but that as the governor-arm swings outwardly the pivots 20, 29, and 31 approach a straight line, and the line of thrust of the spring 33 is moved farther and farther out of the path of travel of the pin 29. The operation is as follows:

Power is transmitted to the pulley 11 by a suitable belt connected, when the clutch is applied to a threshing-machine, to the separator-operating devices. When the separator attains the desired threshing speed, the governor-arms will be thrown outwardly, and the friction-band 26 will be drawn around the friction-wheel 12, thereby causing this member and the shaft 10, which drives the feeding devices, to be revolved with the pulley. When the separator-operating devices slow down—as, for example, when the machine is stopped—the governor-arms will swing inwardly sufficiently to disengage the band 26 from the friction-wheel as soon as the speed of the separator falls below the threshing limit, so that the feeding devices will be stopped.

Because of the peculiar location of the two-part slide and the cushion-spring 33 the thrust of the spring is strongly opposed to the initial movement of the governor-arms, but after the governor-arms once commence to move the thrust of the spring is less and less directly opposed to such movement and the increments of resistance of said spring diminish as the governor-arms move outwardly. By this arrangement the operation of the automatic clutch is made more precise and certain, since the spring effectually resists the movement of the arms until the desired speed is attained; but as soon as the arms commence to move the thrust of the spring is less effective, thereby enabling the further movement of the arms to strain the friction-band firmly about the wheel and insuring thereby that there will be no slipping between the parts. Further, the arrangement of the curved governor-arms intermediate the rims of the adjacent pulley and friction-wheel permits of the use of a larger and more effective friction-wheel and produces a compact and strong device.

It is obvious that the precise details set forth may be varied by the skill of the mechanic without departure from the essentials of the invention.

Having thus described my invention, what I claim as new, and desire to secure by Letters Patent, is—

1. In an automatic clutch, the combination with a rotatable drive-shaft, of fixed and loose rotatable clutch members thereon, centrifugally-operated devices mounted on one of said clutch members for engaging and rotating the other clutch member, spring mechanism for opposing the outward movement of said devices, said spring mechanism being so arranged that the leverage of the spring diminishes as the centrifugally-operated devices move outwardly.

2. In an automatic clutch, the combination with a rotatable drive-shaft, of fixed and loose rotatable clutch members thereon, weighted arms pivoted to one of said members and means operatively connected to said arms for engaging and rotating the other of said members, a spring opposing the outward movement of said pivoted arms and connected to one of said arms near its pivot, the opposite ends of said spring and the pivot of said arm being normally out of line, but arranged to approach a straight line as said arm moves outwardly, whereby the leverage of said spring is diminished when the clutch members are in engagement.

3. In an automatic friction-clutch, the combination with a rotatable drive-shaft, of a friction-wheel and a pulley thereon, one of which parts is fixed and the other loose on said shaft, weighted arms pivoted to said pulley and provided with suitable means for engaging and rotating said friction-wheel, a spring connected to one of said arms near its pivot, and to said pulley, the pivot of said arm and the points of connection of said spring being normally out of line, but arranged to approach a straight line as said weighted arms move outwardly, whereby the leverage of said spring is diminished when said clutch members are in engagement.

4. In an automatic friction-clutch, the combination with a shaft, of a fixed friction-wheel and a loose pulley thereon, said pulley being provided with weighted governor-arms and a friction-band operated thereby for engaging said friction-wheel, a two-part slide pivoted to one of said arms and to said pulley, and a cushion-spring interposed between the parts of said slide.

5. In an automatic friction-clutch, the combination with a shaft, of a friction-wheel and a pulley thereon forming fixed and loose clutch members, said pulley being provided with weighted governor-arms and a friction device operated thereby for engaging said friction-wheel, a two-part slide pivoted to said pulley and to one of said governor-arms near its pivot, the pivots of said slide and of said governor-arm being normally out of line but arranged to approach a straight line as said governor-arm swings outwardly, and a cushion-spring between the parts of said slide.

6. In an automatic friction-clutch, the combination with a shaft, of a fixed friction-wheel and a loose pulley thereon, said pulley being provided with weighted governor-arms and a friction-band operated thereby for engaging said friction-wheel, a two-part slide pivoted to one of said arms and to said pulley, a cushion-spring interposed between the parts of said slide, and a movable collar upon one of said parts for adjusting the tension of said spring.

7. In an automatic friction-clutch, the combination with a shaft, of a loose pulley and a fixed friction-wheel thereon, a pair of connected weighted governor-arms pivoted to said pulley, a friction-band for engaging said wheel secured at one end to the pivot of one of said arms and at its other end to said arm adjacent its pivot, a two-part slide comprising a socket and a bolt engaging said socket, one of said parts being pivoted to said pulley and the other to one of said governor-arms and a cushion-spring interposed between said socket and said bolt.

8. In an automatic friction-clutch, the combination with a shaft, of a loose pulley thereon and a friction-wheel secured to said shaft adjacent said pulley, a pair of curved governor-arms interposed between the rims of said wheel and said pulley, supporting-offsets secured to said arms and pivoted at their ends to said pulley, a friction-band for engaging said friction-wheel, secured at one end to one of said pivots and at its other end to one of said offsets, and a spring for opposing the outward movement of said governor-arms.

9. In an automatic friction-clutch, the combination with a shaft, of a loose pulley and a fixed friction-wheel thereon, a pair of weighted governor-arms provided with supporting-offsets for engaging pivots on said pulley, a friction-band for engaging said friction-wheel secured at one end of said pulley and at the other end to one of said governor-arms, and a cushion-spring interposed between said pulley and the end of one of said arms and extending substantially in line with the latter.

10. In an automatic friction-clutch, the combination with a shaft, of a loose pulley thereon, a ring secured to said pulley by offset studs, a friction-wheel arranged intermediate said ring and said pulley and fixed to said shaft, weighted governor-arms pivoted to opposite offset studs, a friction-band for engaging said wheel secured at one end to one of said studs and at the other end to one of said governor-arms, and a spring for opposing the outward movement of said governor-arms.

JAMES R. HARRISON.

Witnesses:
HENRY D. BALLARD,
EDWIN E. RUSSELL.